(12) United States Patent
Kim

(10) Patent No.: US 11,812,729 B2
(45) Date of Patent: Nov. 14, 2023

(54) AUTOMATICALLY UNFOLDABLE BEEKEEPING APPARATUS

(71) Applicant: Jungin Kim, Gimcheon-si (KR)

(72) Inventor: Jungin Kim, Gimcheon-si (KR)

( * ) Notice: Subject to any disclaimer, the term of this patent is extended or adjusted under 35 U.S.C. 154(b) by 237 days.

(21) Appl. No.: 17/420,140

(22) PCT Filed: Mar. 5, 2020

(86) PCT No.: PCT/KR2020/003102
§ 371 (c)(1),
(2) Date: Jun. 30, 2021

(87) PCT Pub. No.: WO2020/184896
PCT Pub. Date: Sep. 17, 2020

(65) Prior Publication Data
US 2022/0079122 A1 Mar. 17, 2022

(30) Foreign Application Priority Data
Mar. 14, 2019 (KR) .......................... 10-2019-0029508

(51) Int. Cl.
*A01K 49/00* (2006.01)
*B60P 1/20* (2006.01)

(52) U.S. Cl.
CPC .............. *A01K 49/00* (2013.01); *B60P 1/20* (2013.01)

(58) Field of Classification Search
CPC B60P 1/20; A01K 49/00; A01K 47/00; A01K 47/06; B62D 21/14; B62D 33/08
USPC ....... 449/27; 296/26.01, 26.12, 26.15, 24.31, 296/24.32, 24.3, 26.03, 26.14
See application file for complete search history.

(56) References Cited

U.S. PATENT DOCUMENTS 2,451,275 A * 10/1948 Cercownay ............ B60N 3/001
224/508
2,470,360 A * 5/1949 Messick .................... B60P 1/20
298/16
(Continued)

FOREIGN PATENT DOCUMENTS

CN 105379645 A * 3/2016
CN 107006402 A 8/2017
(Continued)

OTHER PUBLICATIONS

International Search Report for PCT/KR2020/003102 dated Jun. 16, 2020 from Korean Intellectual Property Office.

*Primary Examiner* — Brady W Frazier
*Assistant Examiner* — Zoe Tam Tran
(74) *Attorney, Agent, or Firm* — Revolution IP, PLLC

(57) ABSTRACT

An automatically unfoldable beekeeping apparatus includes: a bottom unit installed in a loading unit of a vehicle; a shelf frame rotatably coupled to an end of the bottom unit; a first link unit configured to connect the bottom unit and the shelf frame to each other, support the shelf frame disposed in a vertical state by being bent into the shelf frame when the shelf frame is folded, and support the shelf frame disposed in a horizontally state by being unfolded to the outside of the shelf frame when the shelf frame is unfolded; and a first driving unit configured to connect the bottom unit and the first link unit to each other and dispose the shelf frame connected to the first link unit in a vertical or horizontal state by rotating the first link unit in one direction or the other direction.

3 Claims, 5 Drawing Sheets

(56) References Cited

U.S. PATENT DOCUMENTS

| | | | | |
|---|---|---|---|---|
| 5,908,215 A | * | 6/1999 | Hanser | B60P 3/34 296/26.15 |
| 2007/0222247 A1 | * | 9/2007 | Jaeck | B60P 3/40 296/183.1 |
| 2008/0217945 A1 | * | 9/2008 | Barnes | B62D 33/027 296/26.12 |
| 2012/0193942 A1 | * | 8/2012 | Nye | B62D 63/061 296/191 |
| 2018/0220627 A1 | | 8/2018 | Linder et al. | |

FOREIGN PATENT DOCUMENTS

| | | | |
|---|---|---|---|
| JP | 2767195 | B2 | 6/1998 |
| KR | 10-1218244 | B1 | 1/2013 |
| KR | 10-1423327 | B1 | 7/2014 |

* cited by examiner

[FIG. 1]
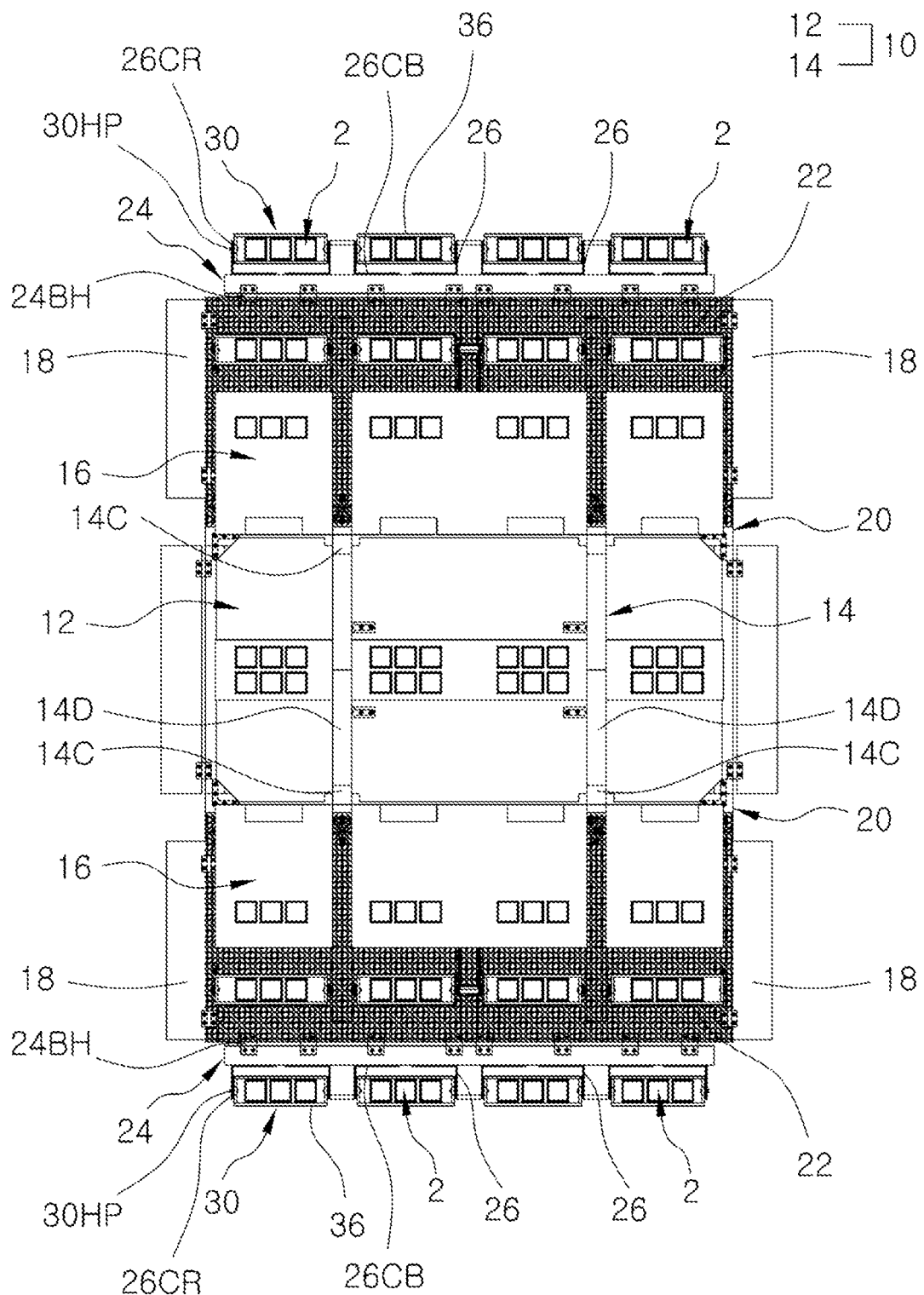
Prior Art

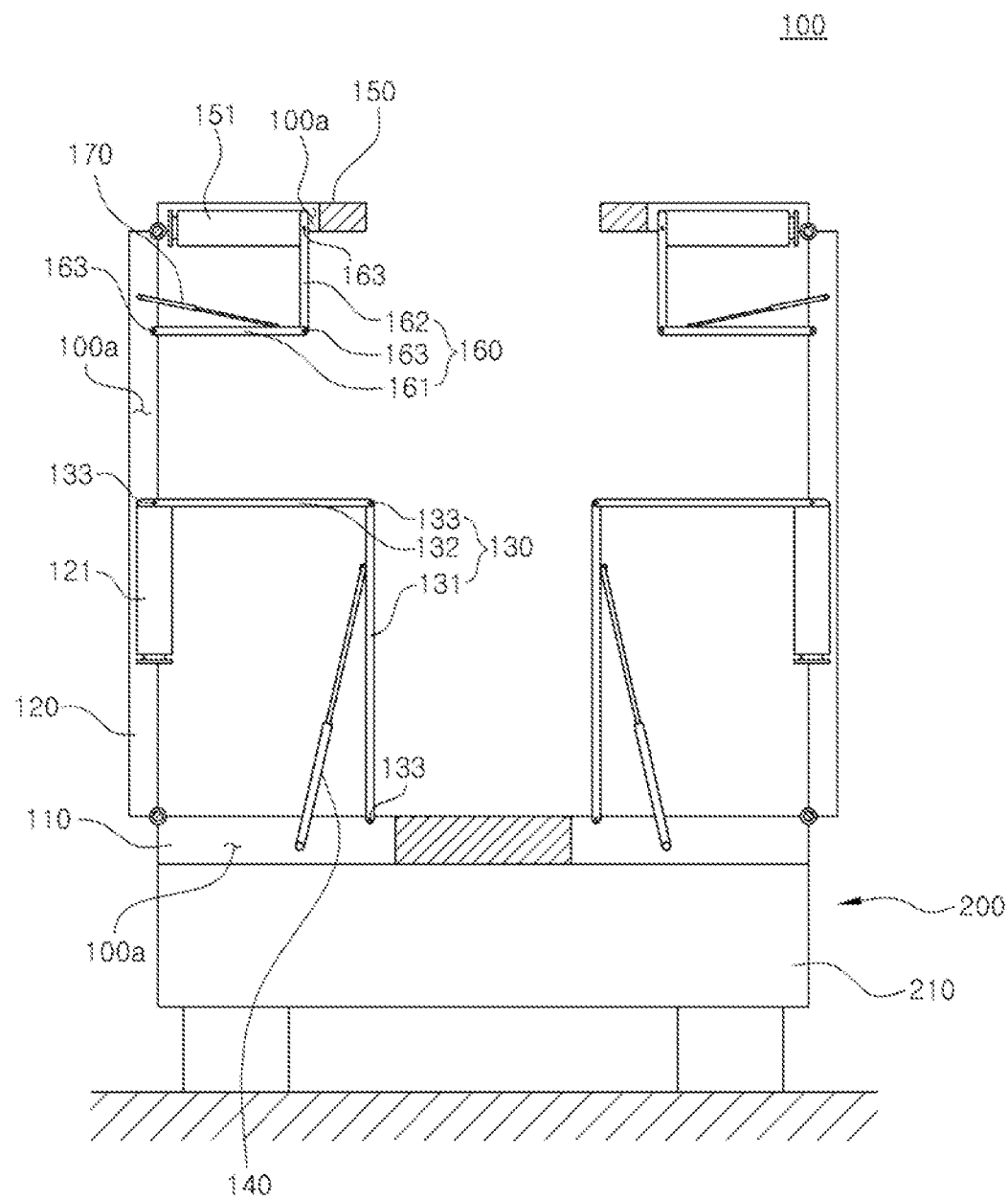
[FIG. 2]

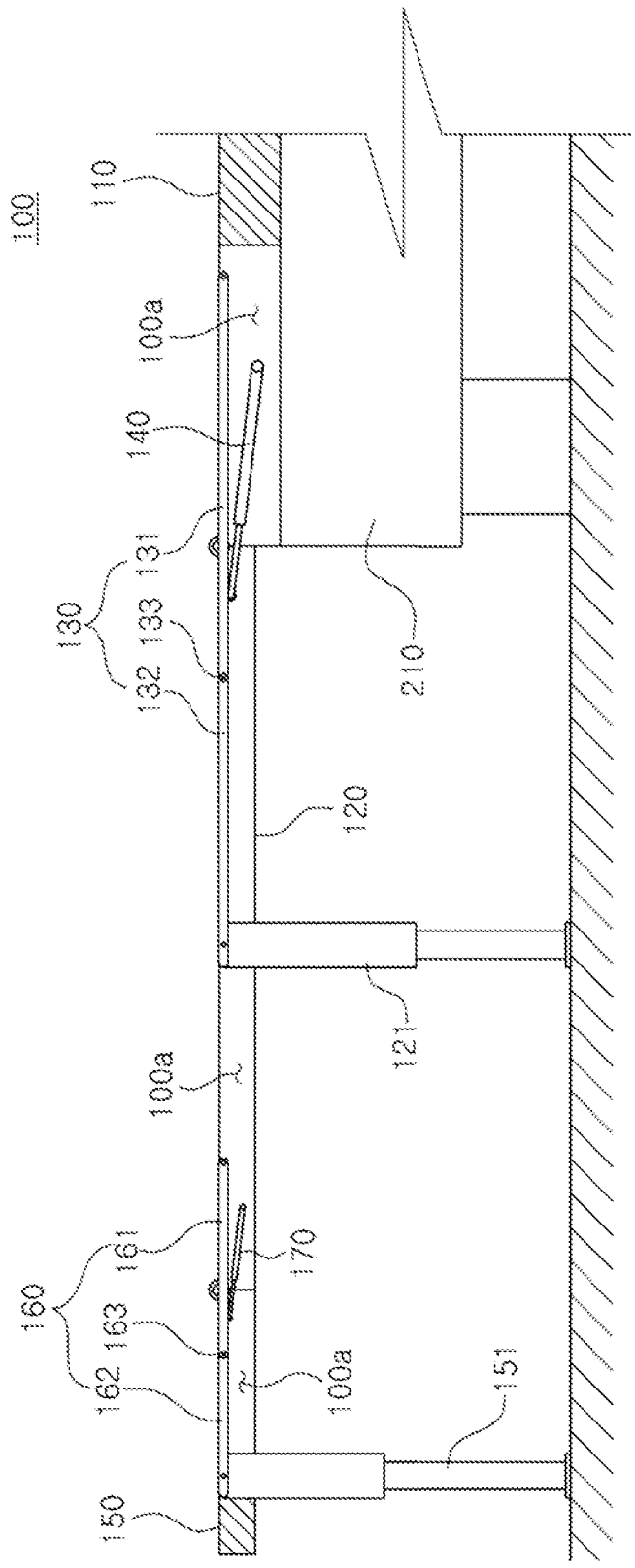

[FIG. 4]
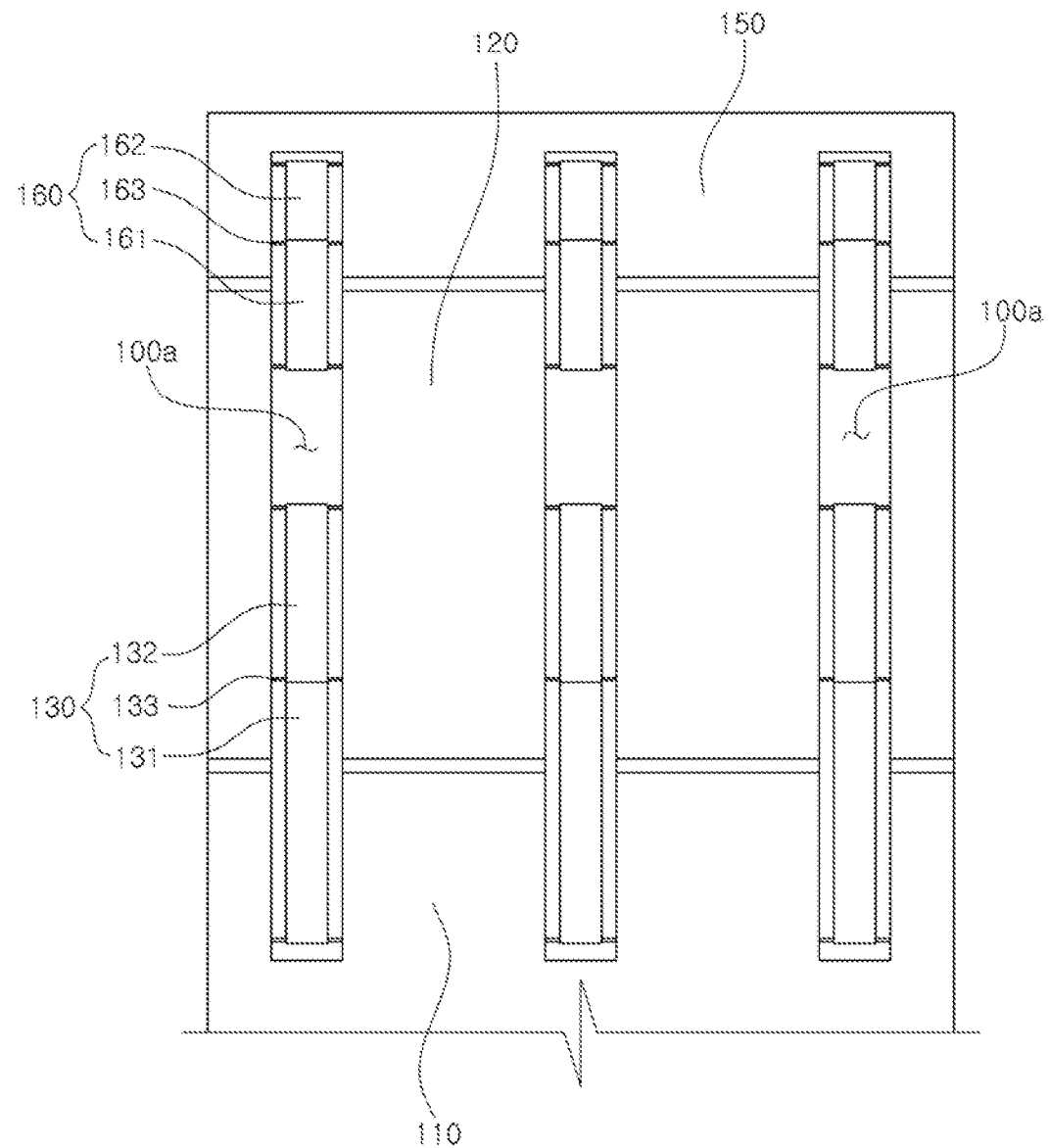

[FIG. 5]
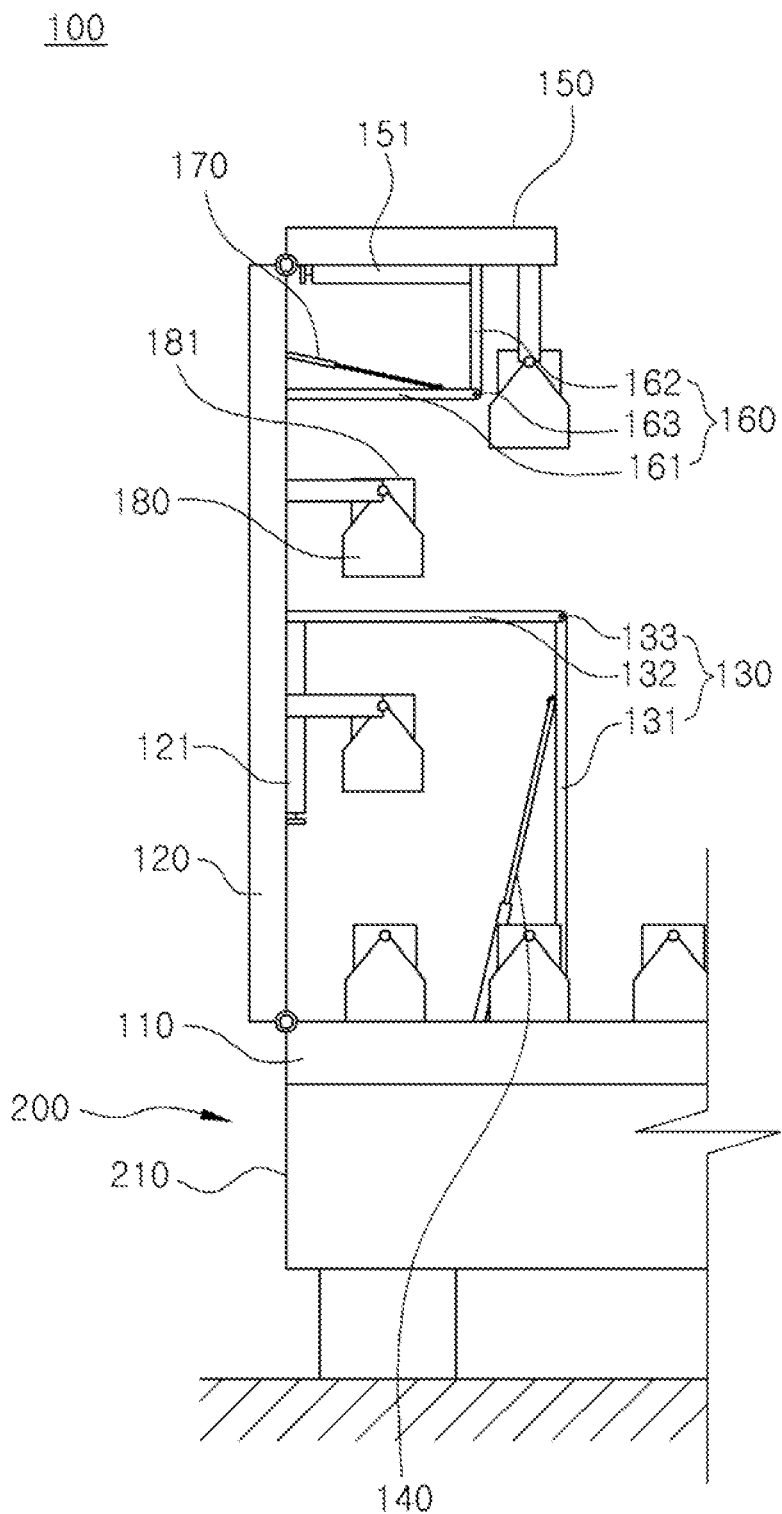

US 11,812,729 B2

AUTOMATICALLY UNFOLDABLE BEEKEEPING APPARATUS

TECHNICAL FIELD

The present invention relates to an automatically unfoldable beekeeping apparatus.

BACKGROUND ART

Beekeeping is a work for breeding bees to get honey, and more particularly, means that bees build beehives in a plurality of honeycombs introduced in a beekeeping bin and obtain honey from the beehives.

Meanwhile, the beekeeping work allows the bees to collect the honey by moving and installing the beehives at a flowering place at a flowering time of a honey plant, that is, flowers capable of collecting the honey.

Accordingly, in the beekeeping work, a mobile vehicle with a load space that can be loaded with beekeeping bins is necessarily required, and through this, a worker performs the beekeeping work at a desired place by quickly moving to a beekeeping area.

However, in the related art, since the beekeeping bins are loaded in the loading space of the mobile vehicle in a single layer, there is a limitation to load and carry a plurality of beekeeping bins, and as a result, there is a problem to drive the vehicle multiple times to carry the plurality of beekeeping bins.

Further, whenever the beekeeping bins are carried, work of loading and unloading the beekeeping bins in the vehicle need to be repetitively performed, and as a result, the workability is reduced, of course, and there is a problem such as causing a waste of installation time of the beekeeping bins and requiring a lot of distribution costs.

Accordingly, in the related art, to solve the problems, a beekeeping container capable of loading and carrying the plurality of beekeeping bins has been developed.

Referring to FIG. 1, a conventional beekeeping container includes a shelf frame 20 rotatably coupled to a container body 10, and a beekeeping bin shelf 30 which is rotatably coupled to the shelf frame 20 to be always erected in a vertical direction when the shelf frame 20 is unfolded or erected, so as to maintain a box structure such as a container by folding a beekeeping bin 2 when storing and moving, and on the contrary, to maintain a flat structure by unfolding the beekeeping bin 2 when installing.

Accordingly, the conventional beekeeping container has advantages of not only stably loading the plurality of beekeeping bins 2, but also reducing efforts and time for carrying and installing the beekeeping bins 2 because the worker does not load the beekeeping bins 2 in the vehicle or unload the beekeeping bins 2 from the vehicle one by one even when changing a beekeeping location or arriving at the beekeeping location.

However, since the conventional beekeeping container is configured so that the worker needs to directly unfold or fold the shelf frame 20, in order to unfold or fold shelf frame 20 having a high weight, a plurality of workers need to go into the work together, and as a result, there is a problem that labor costs are increased, of course, and it is not easy to operate the shelf frame 20.

Furthermore, in the related art, when the shelf frame 20 is folded, since a separate support frame 14 needs to be installed inside to support the shelf frame 20, the cost of production increases, of course, the overall weight is increased, and as a result, there is a problem that more beekeeping bins 2 cannot be loaded.

DISCLOSURE

Technical Problem

The present invention is derived to solve the problems, and an object of the present invention is to provide an automatically unfoldable beekeeping apparatus capable of improving work efficiency and convenience of a user and furthermore, reducing costs by automatically unfolding and folding a shelf frame.

Another object of the present invention is to provide an automatically unfoldable beekeeping apparatus capable of stably supporting the folded shelf frame even while a separate support frame is not provided.

The objects of the present invention are not limited to the aforementioned object, and other objects, which are not mentioned above, will be apparent to a person having ordinary skill in the art from the following description.

Technical Solution

According to an embodiment of the present invention, there is provided an automatically unfoldable beekeeping apparatus comprising: a bottom unit installed in a loading unit of a vehicle; a shelf frame rotatably coupled to an end of the bottom unit; a first link unit configured to connect the bottom unit and the shelf frame to each other, support the shelf frame disposed in a vertical state by being bent into the shelf frame when the shelf frame is folded, and support the shelf frame disposed in a horizontal direction by being unfolded to the outside of the shelf frame when the shelf frame is unfolded; and a first driving unit configured to connect the bottom unit and the first link unit to each other and dispose the shelf frame connected to the first link unit in a vertical or horizontal state by rotating the first link unit in one direction or the other direction.

The first link unit may include a first main link member rotatably coupled to the bottom unit; a second main link member having one side rotatably coupled to the shelf frame and the other side rotatably coupled to the first main link member; and a first hinge means connecting the bottom unit and the first main link member, the shelf frame and the second main link member, and the first main link member and the second main link member.

When the first link unit is bent into the shelf frame, the first main link member may be disposed in parallel to the shelf frame and the second main link member may be disposed in parallel to the bottom unit.

The first driving unit may be formed by a hydraulic cylinder which is rotated in one direction together with the first main link member when extending to dispose the shelf frame in a vertical state to the bottom unit and rotated in the other direction together with the first main link member when contracting to dispose the shelf frame in a parallel state to the bottom unit.

The automatically unfoldable beekeeping apparatus may further include a first load support unit which is fixed in a vertical state to the second main link member and supported to the ground when the shelf frame is disposed in a parallel state to the bottom unit to distribute the load applied to the shelf frame in a vertical direction to the ground.

The automatically unfoldable beekeeping apparatus may further include an extension frame rotatably coupled to an end of the shelf frame; a second link unit configured to connect the shelf frame and the extension frame to each other, support the extension frame disposed in a horizontal state by being bent into the extension frame when the extension frame is folded, and support the extension frame disposed in a vertical state by being unfolded to the outside of the extension frame when the extension frame is unfolded; and a second driving unit configured to connect the shelf frame and the second link unit to each other and dispose the extension frame connected to the second link unit in a horizontal or vertical state by rotating the second link unit in one direction or the other direction.

The second link unit may include a first auxiliary link member rotatably coupled to the shelf frame; a second auxiliary link member having one side rotatably coupled to the extension frame and the other side rotatably coupled to the first auxiliary link member; and a second hinge means connecting the shelf frame and the first auxiliary link member, the extension frame and the second auxiliary link member, and the first auxiliary link member and the second auxiliary link member.

When the second link unit is bent into the extension frame, the first auxiliary link member may be disposed in parallel to the extension frame and the second auxiliary link member may be disposed in parallel to the shelf frame.

The second driving unit may be formed by a hydraulic cylinder which is rotated in one direction together with the first auxiliary link member when extending to dispose the extension frame in a vertical state to the shelf frame and rotated in the other direction together with the first auxiliary link member when contracting to dispose the extension frame in a parallel state to the shelf frame.

The automatically unfoldable beekeeping apparatus may further include a second load support unit which is fixed in a vertical state to the second auxiliary link member and supported to the ground when the extension frame is disposed in a parallel state to the shelf frame to distribute the load applied to the extension frame in a vertical direction to the ground.

In the bottom unit, the shelf frame, and the extension frame, accommodation grooves capable of accommodating the first link unit and the second link unit may be formed when the shelf frame and the extension frame are unfolded.

The automatically unfoldable beekeeping apparatus may further include a beekeeping bin shelf which accommodates a beekeeping bin therein and is rotatably coupled into the shelf frame and the extension frame to maintain the beekeeping bin in a vertical state at all times.

Advantageous Effects

According to the embodiment of the present invention, an automatically foldable and unfoldable beekeeping apparatus can be realized through a plurality of link units and a plurality of driving units, thereby remarkably improving the work efficiency and convenience of a user as compared to a conventional beekeeping container, being rapidly installed and dissembled, and remarkably saving costs by excluding repetitive work and minimizing labors required for work.

Further, the shelf frame can be stably supported through the plurality of link units and the plurality of driving units without a separate support frame, thereby reducing manufacturing cost and increasing the productivity of beekeeping work by loading a larger amount of beekeeping bins.

DESCRIPTION OF DRAWINGS

FIG. 1 is a diagram illustrating a conventional beekeeping container.

FIG. 2 is a diagram schematically illustrating a state in which an automatically unfoldable beekeeping apparatus according to an embodiment of the present invention is folded.

FIG. 3 is a diagram schematically illustrating a state in which the automatically unfoldable beekeeping apparatus according to the embodiment of the present invention is unfolded.

FIG. 4 is a plan view schematically illustrating a state in which the automatically unfoldable beekeeping apparatus according to the embodiment of the present invention is unfolded.

FIG. 5 is a diagram schematically illustrating a state in which beekeeping bin shelves are installed in the automatically unfoldable beekeeping apparatus according to the embodiment of the present invention is folded.

MODES FOR THE INVENTION

Hereinafter, various embodiments will be described in detail with reference to the accompanying drawings. The embodiments described herein may be variously modified. Specific embodiments are described in the drawings and may be described in detail in the detailed description. It should be understood, however, that the specific embodiments disclosed in the accompanying drawings are intended only to facilitate understanding of various embodiments. Accordingly, it is to be understood that the technical idea is not limited by the specific embodiments disclosed in the accompanying drawings, but includes all equivalents or alternatives included within the spirit and scope of the invention.

Terms including ordinal numbers, such as first and second, may be used for describing various components, but the components are not limited by the terms. The aforementioned terminologies are used only to discriminate one component from the other component.

In this specification, it should be understood that term "comprising" or "having" indicates that a feature, a number, a step, an operation, a component, a part or a combination thereof described in the specification is present, but does not exclude a possibility of presence or addition of one or more other features, numbers, steps, operations, components, parts or combinations, in advance. It should be understood that, when it is described that a component is "connected to" or "access" the other component, the component may be directly connected to or access the other component or another component may be present therebetween. In contrast, it should be understood that, when it is described that an element is "directly connected to" or "directly access" another element, it is understood that no element is present between the element and another element.

Meanwhile, the "module" or "unit" for the component used in this specification performs at least one function or operation. In addition, the "module" or "unit" may perform a function or operation by hardware, software, or a combination of hardware and software. Also, a plurality of "modules" or a plurality of "units" except for the "module" or "unit" performed in specific hardware or performed in at least one processor may be combined into at least one module. A singular form may include a plural form unless otherwise clearly indicated in the context.

In addition, in describing the present invention, a detailed description of known related functions or configurations may be contracted or omitted when it is determined that the subject matter of the present invention is unnecessarily obscured.

FIG. 2 is a diagram schematically illustrating a state in which an automatically unfoldable beekeeping apparatus according to an embodiment of the present invention is folded, FIG. 3 is a diagram schematically illustrating a state in which the automatically unfoldable beekeeping apparatus according to the embodiment of the present invention is unfolded, FIG. 4 is a plan view schematically illustrating a state in which the automatically unfoldable beekeeping apparatus according to the embodiment of the present invention is unfolded, and FIG. 5 is a diagram schematically illustrating a state in which beekeeping bin shelves are installed in the automatically unfoldable beekeeping apparatus according to the embodiment of the present invention is folded.

Referring to FIGS. 2 and 3, an automatically unfoldable beekeeping apparatus 100 according to an embodiment of the present invention includes a bottom unit 110 installed in a loading unit 210 of a vehicle 200.

The bottom unit 110 is formed in a rectangular panel structure and installed in the loading unit 210 of the vehicle 200, has a space capable of mounting a beekeeping bin shelf 180 and a moving path to allow a beekeeping worker to move between a plurality of beekeeping bin shelves 180 on one surface, and may support the shelf frame 120 to be described below to be rotatable.

Further, although not illustrated, a frame disposed in a lattice structure may be further included in a lower side of the bottom unit 110 to support an upper panel, and panels provided at an upper side of the fame are stacked in multilayers in a vertical direction while the shelf frame 120 is folded and slidably move in a direction where the shelf frame 120 is unfolded while the shelf frame 120 is unfolded to be formed in a telescope structure capable of expanding an area. For example, in the frame of supporting the plurality of panels stacked in multilayers, a guide rail is provided to guide the movement of the plurality of panels and the plurality of panels installed on the guide rail are connected to a separate withdrawal device to be automatically unfolded and folded.

Further, the automatically unfoldable beekeeping apparatus 100 includes the shelf frame 120.

Referring to FIGS. 2 and 3, the shelf frame 120 is rotatably coupled to both ends of the bottom unit 110 to be unfolded or folded according to the driving of a first driving unit 140 to be described below.

More specifically, the shelf frame 120 is rotatably coupled to a side end of the bottom unit 110 through a separate hinge means and is unfolded outward or folded inward by receiving a force from a first link unit 130 to be described below according to the driving of the first driving unit 140.

At this time, the shelf frame 120 is disposed in a parallel state to the bottom unit 110 when unfolding as illustrated in FIG. 3 and disposed in a vertical state to the bottom unit 110 when folding as illustrated in FIG. 2.

For example, the shelf frame 120 may include a lattice-structured frame (not illustrated) rotatably coupled to an end of the bottom unit 110 through a separate hinge means and a panel (not illustrated) covering an outer surface of the frame.

Meanwhile, a second main link member 132 of the first link unit 130 to be described below may further include a first load support unit 121 which is supported on the ground when the shelf frame 120 is unfolded to support the shelf frame 120.

Referring to FIGS. 2 and 3, the first load support unit 121 may be fixed in a vertical state to the second main link member 132. Particularly, the first load support unit 121 may be fixed to a portion of the second main link member 132 adjacent to the shelf frame 120. Accordingly, the first load support unit 121 may be disposed vertically to the ground when the shelf frame 120 is rotated to be parallel to the bottom unit 110.

In addition, the first load support unit 121 may be formed in an extendable structure.

For example, although not illustrated in detail, the first load support unit 121 may include a body fixed to the second main link member 132, an extension rod which is retractably installed in the body to extend or contract the entire length of the first load support unit 121, a support plate which is coupled to an end of the extension rod to be rotatable along the slope of the ground and supported on the ground, and a driving means controlling the movement of the extension rod.

Accordingly, when the shelf frame 120 is disposed in a parallel state to the bottom unit 110, the first load support unit 121 is extended by a predetermined length to be supported on the ground and as a result, distributes the load applied in a vertical direction to the second main link member 132 and the shelf frame 120 to the ground, thereby preventing the modification and damage of the shelf frame 120.

Further, the automatically unfoldable beekeeping apparatus 100 includes the first link unit 130.

Referring to FIGS. 2 and 3, the first link unit 130 is configured to connect the bottom unit 110 and the shelf frame 120 to each other and include at least one joint structure to be bent at a predetermined angle when the shelf frame 120 is folded.

Further, the first link unit 130 may dispose the shelf frame 120 in a vertical or horizontal state through an external force transmitted through the first driving unit 140 to be described below.

That is, the first link unit 130 may maintain the shelf frame 120 in a vertical state by folding the shelf frame 120 when being bent into the shelf frame 120 through an external force transmitted through the first driving unit 140 and may maintain the shelf frame 120 in a horizontal state by unfolding the shelf frame 120 when being unfolded to the outside of the shelf frame 120.

The first link unit 130 will be described in detail.

Referring to FIGS. 2 to 4, the first link unit 130 may include a first main link member 131, a second main link member 132, and a first hinge means 133.

The first main link member 131 may have one side which is rotatably coupled to the bottom unit 110 through the first hinge means 133 and the other side which is rotatably coupled to the second main link member 132. In addition, the second main link member 132 may have one side which is rotatably coupled to the shelf frame 120 through the first hinge means 133 and the other side which is rotatably coupled to the first main link member 131. For example, in the first main link member 131 and the second main link member 132, through-holes through which the first hinge means 133 may pass are formed in one side and the other side thereof, respectively, and may be formed in a rod shape having a predetermined length. The first hinge means 133 is formed in a pin shape and passes through the bottom unit 110 and the first main link member 131, the shelf frame 120 and the second main link member 132, and the first main link member 131 and the second main link member 132 to connect the bottom unit 110 and the first main link member 131, the shelf frame 120 and the second main link member 132, and the first main link member 131 and the second main link member 132 to each other.

Here, when the first link unit 130 is bent into the shelf frame 120, the first main link member 131 is disposed in parallel to the shelf frame 120 disposed in the vertical state and the second main link member 132 rotatably coupled to the first main link member 131 may be disposed in parallel to the bottom unit 110. On the contrary, when the first link unit 130 is unfolded to the outside of the shelf frame 120, the first main link member 131 and the second main link member 132 may be disposed in parallel to the shelf frame 120 disposed in the horizontal state.

Further, the automatically unfoldable beekeeping apparatus 100 includes the first driving unit 140.

Referring to FIGS. 2 and 3, the first driving unit 140 connects the bottom unit 110 and the first link unit 130 to each other and is rotatable together with the first link unit 130 and formed in an extendable structure. Accordingly, the first driving unit 140 applies a pushing or pulling force to the first link unit 130 through extension or contraction to rotate the first link unit 130 in one direction or the other direction and then rotates the shelf frame 120 connected to the first link unit 130 to dispose the shelf frame 120 in a vertical or horizontal state.

More specifically, the first driving unit 140 may have one side rotatably coupled to the bottom unit 110 and the other side rotatably coupled to the first main link member 131. In addition, the first driving unit 140 may be formed in an extendable hydraulic cylinder. Accordingly, when the first driving unit 140 is extended, the first driving unit 140 transmits a pushing force to the first main link member 131 to be rotated in one direction together with the first main link member 131 and as a result, may dispose the shelf frame 120 in a vertical state to the bottom unit 110. On the contrary, when the first driving unit 140 is contracted, the first driving unit 140 transmits a pulling force to the first main link member 131 to be rotated in the other direction together with the first main link member 131 and as a result, may dispose the shelf frame 120 in a parallel state to the bottom unit 110.

However, the first driving unit 140 is not necessarily formed in the hydraulic cylinder, but may be modified and applied in various shapes within conditions capable of performing the same function.

Further, the automatically unfoldable beekeeping apparatus 100 may further include an extension frame 150, a second link unit 160, and a second driving unit 170.

Referring to FIGS. 2 and 3, the extension frame 150 is rotatably coupled to an end of each shelf frame 120 provided in plural to be unfolded or folded according to the driving of the second driving unit 170 to be described below.

More specifically, the extension frame 150 is rotatably coupled to the end of each shelf frame 120 through a separate hinge means and may be unfolded outward or folded inward by receiving a force from the second link unit 160 to be described below according to the driving of the second driving unit 170.

At this time, the extension frame 150 may be disposed in a parallel state to the shelf frame 120 when unfolding as illustrated in FIG. 3 and disposed in a vertical state to the shelf frame 120 when folding as illustrated in FIG. 2.

For example, the extension frame 150 may include a lattice-structured frame rotatably coupled to the end of the shelf frame 120 through a separate hinge means and a panel covering the outer surface of the frame.

Meanwhile, a second auxiliary link member 162 of the second link unit 160 to be described below may further include a second load support unit 151 supported on the ground when the extension frame 150 is unfolded to support the extension frame 150.

Referring to FIGS. 2 and 3, the second load support unit 151 may be fixed in a vertical state to the second auxiliary link member 162. Accordingly, the second load support unit 151 may be disposed vertically to the ground when the extension frame 150 is rotated to be in a parallel state to the shelf frame 120 while the shelf frame 120 is disposed in parallel to the bottom unit 110.

In addition, the second load support unit 151 may be formed in an extendable structure.

For example, although not illustrated in detail, the second load support unit 151 may include a body rotatably installed on an outer surface of the extension frame 150, an extension rod which is retractably installed in the body to extend or contract the entire length of the second load support unit 151, a support plate which is coupled to an end of the extension rod to be rotatable along the slope of the ground and supported on the ground, and a driving means controlling the movement of the extension rod.

Accordingly, when the second load support unit 151 is rotated so that the extension frame 150 is parallel to the shelf frame 120 while the shelf frame 120 is parallel to the bottom unit 110, the second load support unit 151 is extended by a predetermined length to be supported on the ground. Through this, the second load support unit 151 distributes the load applied in a vertical direction to the second auxiliary link member 162 and the extension frame 150 to the ground, thereby preventing the modification and damage of the extension frame 150.

The second link unit 160 is configured to connect the shelf frame 120 and the extension frame 150 to each other and include at least one joint structure so as to be bent at a predetermined angle when the extension frame 150 is folded.

Further, the second link unit 160 may dispose the extension frame 150 in a vertical or horizontal state to the shelf frame 120 through an external force transmitted through the second driving unit 170 to be described below.

That is, the second link unit 160 may maintain the extension frame 150 in a vertical state to the shelf frame 120 by folding the extension frame 150 when being bent into the extension frame 150 through an external force transmitted through the second driving unit 170 and may maintain the extension frame 150 in a horizontal state with the shelf frame 120 by unfolding the extension frame 150 when being unfolded to the outside of the extension frame 150.

The second link unit 160 will be described in detail.

Referring to FIGS. 2 to 4, the second link unit 160 may include a first auxiliary link member 161, a second auxiliary link member 162, and a second hinge means 163.

In addition, the first auxiliary link member 161 may have one side which is rotatably coupled to the shelf frame 120 through a second hinge means 163 and the other side which is rotatably coupled to the second auxiliary link member 162. In addition, the second auxiliary link member 162 may have one side which is rotatably coupled to the extension frame 150 through the second hinge means 163 and the other side which is rotatably coupled to the first auxiliary link member 161. For example, in the first auxiliary link member 161 and the second auxiliary link member 162, through-holes through which the second hinge means 163 may pass are formed in one side and the other side, respectively, and may be formed in a rod shape having a predetermined length. The second hinge means 163 is formed in a pin shape and passes through the shelf frame 120 and the first auxiliary link member 161, the extension frame 150 and the second auxiliary link member 162, and the first auxiliary link member 161 and the second auxiliary link member 162 to connect the shelf frame 120 and the first auxiliary link member 161, the extension frame 150 and the second auxiliary link member 162, and the first auxiliary link member 161 and the second auxiliary link member 162 to each other.

Here, when the second link unit 160 is bent into the extension frame 150, the first auxiliary link member 161 is disposed in parallel to the extension frame 150 disposed in the vertical state to the shelf frame 120 and the second auxiliary link member 162 rotatably coupled to the first auxiliary link member 161 may be disposed in parallel to the shelf frame 120. On the contrary, when the second link unit 160 is unfolded to the outside of the extension frame 150, the first auxiliary link member 161 and the second auxiliary link member 162 may be disposed in the horizontal state with the shelf frame 120.

The second driving unit 170 connects the shelf frame 120 and the second link unit 160 to each other, but may be rotated together with the second link unit 160, and may be formed in an extendable structure. Accordingly, the second driving unit 170 applies a pushing or pulling force to the second link unit 160 through extension or contraction to rotate the second link unit 160 in one direction or the other direction and as a result, rotates the extension frame 150 connected to the second link unit 160 to dispose the extension frame 150 in a vertical or horizontal state.

More specifically, the second driving unit 170 may have one side rotatably coupled to the shelf frame 120 and the other side rotatably coupled to the first auxiliary link member 161. In addition, the second driving unit 170 may be formed in an extendable hydraulic cylinder. Accordingly, when the second driving unit 170 is extended, the second driving unit 170 transmits a pushing force to the first auxiliary link member 161 to be rotated in one direction together with the first auxiliary link member 161 and as a result, may dispose the extension frame 150 in a vertical state to the shelf frame 120. On the contrary, when the second driving unit 170 is contracted, the second driving unit 170 transmits a pulling force to the first auxiliary link member 161 to be rotated in the other direction together with the first auxiliary link member 161 and as a result, may dispose the extension frame 150 in a parallel state to the shelf frame 120.

However, the second driving unit 170 is not necessarily formed in the hydraulic cylinder, but may be modified and applied in various shapes within conditions capable of performing the same function.

Meanwhile, referring to FIG. 4, in the bottom unit 110, the shelf frame 120, and the extension frame 150, accommodation grooves 100a capable of accommodating the first link unit 130 and the second link unit 160 may be formed when the shelf frame 120 and the extension frame 150 are unfolded.

As a result, it is possible to prevent the damage to the first link unit 130 and the second link unit 160 from an external impact by preventing the plurality of link units from being exposed to the outside of the beekeeping apparatus 100. In addition, it is possible to allow bees to more smoothly move to the beekeeping bin 181 by preventing the first link unit 130 and the second link unit 160 from protruding from the surface of the shelf frame 120 and the extension frame 150 in which the beekeeping bin 181 and the beekeeping bin shelf 180 are installed during beekeeping.

For example, it may be preferred that a plurality of accommodation grooves 100a is formed.

Further, the automatically unfoldable beekeeping apparatus 100 includes the beekeeping bin shelf 180.

Referring to FIG. 5, the beekeeping bin shelf 180 accommodates the beekeeping bin 181 therein and may be seated on the upper surface of the bottom unit 110 or rotatably coupled to the inside of the shelf frame 120 and the extension frame 150 through a separate hinge means. In addition, the beekeeping bin shelf 180 rotates around the hinge means when the shelf frame 120 and the extension frame 150 rotate to maintain the beekeeping bin 181 in a vertical state to the bottom unit 110 at all times.

For example, the beekeeping bin shelf 180 may include a support plate, a pair of support pieces provided at a front end and a rear end of the support plate, and a mounting support bar coupled to the pair of support pieces. In addition, the hinge means rotatably supporting the beekeeping bin shelf 180 may be formed in a "C"-shaped bracket.

As such, according to the embodiment of the present invention, the automatically foldable and unfoldable beekeeping apparatus 100 can be realized through the plurality of link units and the plurality of driving units, thereby remarkably improving the work efficiency and the convenience of a user as compared to a conventional beekeeping container, being rapidly installed and dissembled, and remarkably saving costs by excluding repetitive work and minimizing labors required for work.

Further, the shelf frame 120 can be stably supported through the plurality of link units and the plurality of driving units without a separate support frame, thereby reducing manufacturing cost and increasing the productivity of beekeeping work by loading a larger amount of beekeeping bins 181.

While the preferred embodiments of the present invention have been illustrated and described above, the present invention is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

INDUSTRIAL APPLICABILITY

An automatically foldable and unfoldable beekeeping apparatus can be realized through a plurality of link units and a plurality of driving units, thereby remarkably improving the work efficiency and the convenience of a user as compared to a conventional beekeeping container, being rapidly installed and dissembled, and remarkably saving costs by excluding repetitive work and minimizing labors required for work. Therefore, the present invention has industrial applicability.

The invention claimed is:
1. An unfoldable beekeeping apparatus comprising:
a bottom unit installed in a loading unit of a vehicle;
a first end of a shelf frame rotatably coupled to an end of the bottom unit;
a first link unit configured to connect the bottom unit and the shelf frame to each other, maintain the shelf frame in a vertical state by folding the shelf frame when being bent into the shelf frame, and maintain the shelf frame in a horizontal state by unfolding the shelf frame when being unfolded to the outside of the shelf frame;
a first driving unit configured to connect the bottom unit and the first link unit to each other and dispose the shelf frame connected to the first link unit in a vertical or horizontal state by rotating the first link unit in one direction or the other direction;

an extension frame rotatably coupled to a second end of the shelf frame;

a beekeeping bin shelf rotatably coupled to an inside of the shelf frame; and a beekeeping bin accommodated inside of the beekeeping bin shelf, wherein the beekeeping bin shelf is rotated upon both of the shelf frame and the extension frame being rotated to maintain the beekeeping bin in a vertical state to the bottom unit, wherein the beekeeping bin shelf includes a support plate, a pair of support pieces provided at a front end and a rear end of the support plate, and a mounting support bar coupled to the pair of support pieces.

2. The unfoldable beekeeping apparatus of claim 1, wherein the first link unit comprises a first main link member rotatably coupled to the bottom unit;

a second main link member having one side rotatably coupled to the shelf frame and the other side rotatably coupled to the first main link member; and a first hinge means connecting the bottom unit and the first main link member, the shelf frame and the second main link member, and the first main link member and the second main link member.

3. The unfoldable beekeeping apparatus of claim 2, wherein the first driving unit is formed by a hydraulic cylinder which is rotated in one direction together with the first main link member when extending to dispose the shelf frame in a vertical state to the bottom unit and rotated in the other direction together with the first main link member when contracting to dispose the shelf frame in a parallel state to the bottom unit.

\* \* \* \* \*